June 3, 1947.  W. KASTEN  2,421,704
FILTER PACKS AND THEIR MANUFACTURE
Filed Feb. 16, 1943  2 Sheets-Sheet 1

INVENTOR.
Walter Kasten
By: Walter M. Fuller atty.

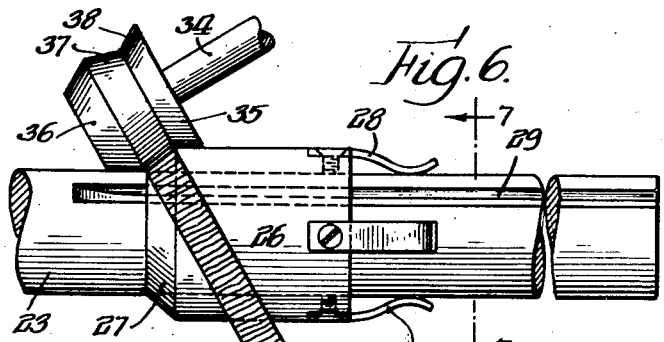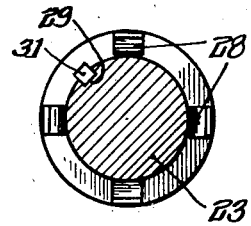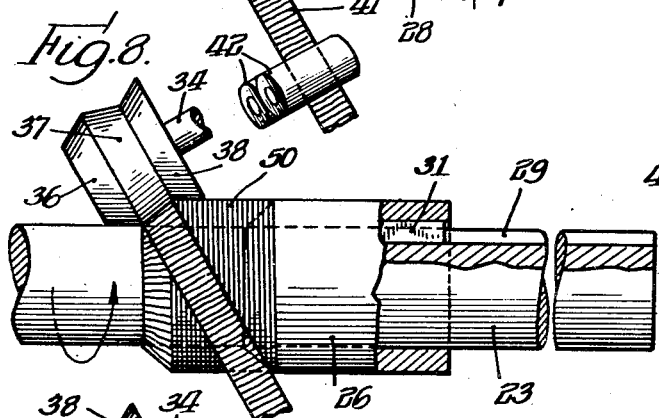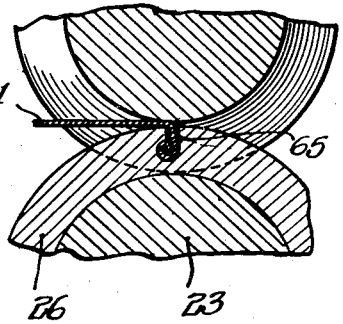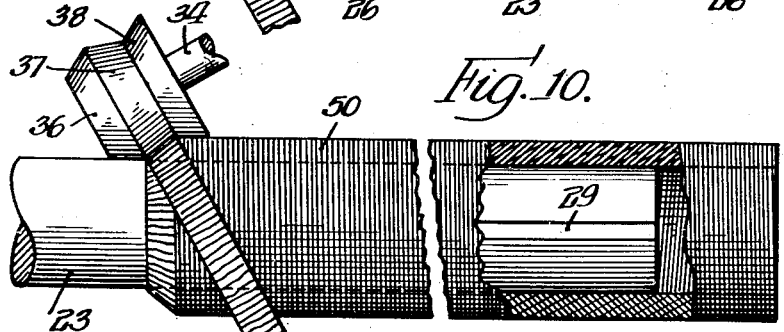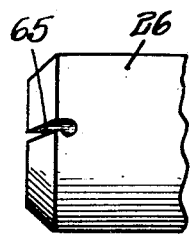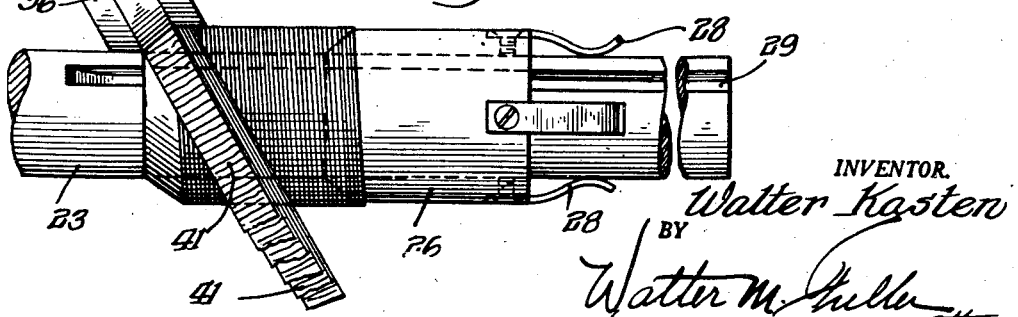

Patented June 3, 1947

2,421,704

UNITED STATES PATENT OFFICE 2,421,704

FILTER PACK AND ITS MANUFACTURE

Walter Kasten, Franklin, Mich., assignor to Ralph L. Skinner, Detroit, Mich.

Application February 16, 1943, Serial No. 476,080

8 Claims. (Cl. 210—169)

The current invention concerns certain features of structural and functional betterment in filters, particularly those of the edge-filtration type, whereby to improve their physical properties and their operating characteristics, the invention in addition, pertaining to the method and means for producing such filter-packs.

Heretofore, filters of this filtration style have been made having filter packs or elements composed of appropriately-mounted, registered, apertured paper-discs charged or impregnated with a medium which precludes such discs from being affected detrimentally by the fluid undergoing filtration or by any of the contaminating media therein.

Such filter-stacks have required suitable means for mounting them in the filter-housing, which may contain several of the packs operating in parallel relation, such means ordinarily comprising a more or less relatively-expensive metal-core for each pack occupying its central passage formed by the registered holes of the superposed discs.

The punching out, handling and mounting of such discs has been a matter of substantial expense and waste in the past, and one of the objects of the present invention is to reduce such cost of production and at the same time improve the structure of the filter-element and its operating capabilities.

The new filter-pack is of the spirally-wound type as distinguished from the multiple-disc form, and, whereas spirally-coiled metal-strips have been heretofore suggested as forms of the filter-means, as disclosed in United States Patents 2,042,537, Liddell, Filter and method of making same, granted June 2, 1936, and 2,133,004, Williams et al., Filter, granted October 11, 1938, such forms of filters are subject to substantial modifications and improvements as represented by the present invention, the details of which betterments are hereinafter set forth.

To enable those trained and skilled in this art to more fully understand the invention and its various advantages, present preferred embodiments thereof have been illustrated in the accompanying drawings, forming a part of this specification and to which reference should be had in connection with the following detailed description, and, for simplicity, like reference numerals have been employed to designate the same parts throughout the several views of such drawings.

In these drawings:

Figure 6 is a detail fragmentary plan of a portion of the mechanism illustrating the form or mandrel, the friction-restrainer, and the winding means for the paper-strip;

Figure 7 is a cross-section on line 7—7 of figure 6;

Figure 8 illustrates the parts indicated in Figure 6 after a portion of one of the packs has been formed, some of the elements being partly broken away to more clearly show the construction;

Figure 9 is a fragmentary, enlarged cross-section through the slidable friction-member showing the manner of attachment of the front end of the paper strip or ribbon;

Figure 10 illustrates in elevation and section the front portion of the body of wound-strip and a part of the friction-member after it has left the mandrel;

Figure 11 shows the winding of a plurality of the paper-strips simultaneously.

Figure 1:
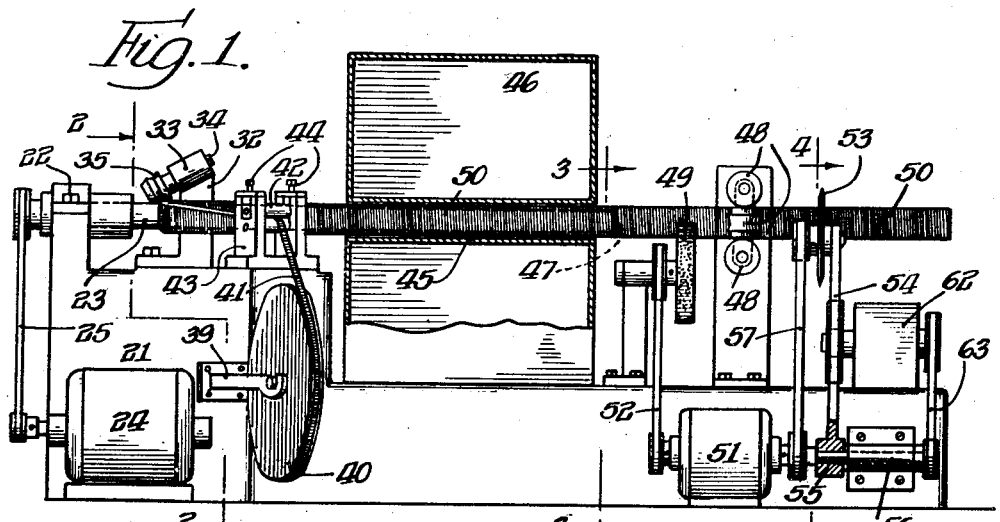
Figure 1 is a general view of the mechanism, shown somewhat diagrammatically, for making the novel type of filterpack.

Referring to these drawings, it will be noted that the machine for the production of the new spirally-wound filter-elements or filter-packs includes a suitable main body or frame 21 on which is mounted a bearing 22 at one end for the accommodation of the elongated, cylindrical mandrel or rotary form 23 revolved at a suitable speed by any appropriate means, such, for instance, as an electric-motor 24 and intervening pulley-and-belt drive, characterized as a whole 25.

As is shown perhaps most clearly in Figure 6, mounted on, and snugly fitting on, such mandrel is a round sleeve 26, bevelled at about 45 degrees at one end at 27 and carrying at its opposite end a plurality of friction-springs 28, 28 having rounded portions pressing on, and ridable on, the surface of the mandrel, such sleeve having a slot-and-key connection 29—31 with the mandrel, whereby the sleeve must revolve with the mandrel and may slide lengthwise thereon yet opposed by the friction presented by the springs.

At such head-end portion of the machine is an adjustable-bracket mounting 32 (Figures 1 and 2) for a bearing 33 in which is rotatable the stem or shank 34 of a pressure-roller, characterized as a whole 35, and having three round portions 36, 37 and 38 (Figure 6); part 36 being adapted to roll on the surface of the mandrel, section 37 coacting with the paper-ribbon, and portion 38 bearing on the cylindrical surface of the wound ribbon.

Also near such end of the machine is a bracket 39 (Figures 1 and 2) adapted to support the supply-roll 40 of the paper tape or ribbon 41 in a manner to allow the unwinding of the latter, whereby it may pass between a pair of pressure-rollers 42, 42, of rubber or other suitable material, revolubly mounted in a standard 43 equipped with adjustable screws 44, 44, by means of which the pressure exerted by the upper roller toward the companion lower roller may be varied or adjusted in a manner well understood and comparable to that of an ordinary wringer.

Further along, the mandrel extends through a tube 45 surrounded by a heater 46, the heat of which is conveyed to the interior of such tube, whereby to heat the wound impregnated paper-ribbon on the mandrel, the heat of such heater being supplied by electricity, gas, or by any other appropriate means.

Figure 2:
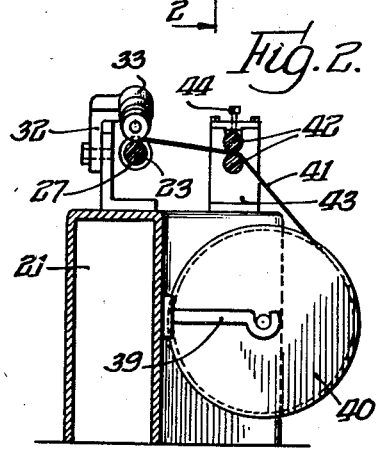
Figure 2 is a vertical cross-section on line 2—2 of Figure 1.
Figure 3:
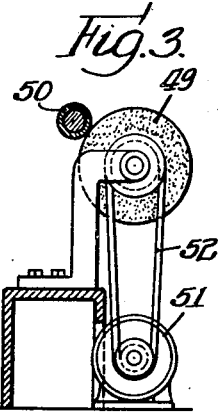
Figure 3 is a similar section on line 3—3 of Figure 1.

Beyond the heater, the mandrel may end at the point designated 47 in Figure 1, and, further beyond this, the hollow body of continuously-wound paper-ribbon may be guided and supported from the outside by four, appropriately-mounted, concave, anti-friction rollers 48, 48 of which only three show in Figure 1.

In some cases, but not necessarily in all instances, it is desirable to grind or polish smooth the cylindrical surface of the wound body 50 and this is brought about by a suitably-supported polishing-wheel 49 engaging the surface of the body and rotated by an electric-motor 51 and intervening driving-means comprising the common type of pulley-and-belt connection, designated as a whole 52.

Beyond this, the individual filter-elements of suitable or proper length are intermittently cut off from the formed body 50 by a round rotary-cutter 53 mounted on a rock-arm 54 oscillatory on the shaft 55 of the electric-motor 51, such shaft being also mounted in a stationary bearing 56 and equipped with a pulley-and-belt drive 57 for the cutter 53.

Figure 4:
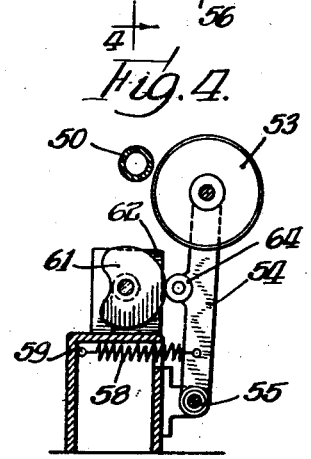
Figure 4 is an analogous section on line 4—4 of Figure 1.

Rock-arm 54 is pulled toward the axis of the rotating form or mandrel by a coiled spring 58 (Figure 4) attached to the arm and to a fixed pin 59, but the changeable position of such arm is determined by a rotary-cam 61 on the shaft of a speed-reducing mechanism 62 of any suitable construction and driven from shaft 55 by a belt-and-pulley connection 63, roller 64 on arm 54 coacting with the edge of cam 61.

This appliance operates as follows:

Assuming that a supply-roll 40 of crepe-paper of correct width, and with its rugosities or ridges of substantially-equal heights extended crosswise such strip or ribbon, has been mounted in the support 39, the advance end of such ribbon is fed between the pressure-rollers 42, 42 and then fastened to the oblique or bevel end surface of the sleeve 26 in any approved manner, as for example, as presented in Figure 9, by folding or rolling over the front end of the ribbon and inserting it in the undercut groove 65 extended across the width of such sloping-surface 27, whereupon the rotation of the mandrel 23 and its associated sleeve 26 is started bringing the forward end of the paper-strip beneath the surface 37 of roller 35, such strip having preliminarily been charged throughout with a polymerizable phenolic-resin, such as Beckophen.

As soon as the specified revolution of the mandrel and sleeve occurs, the winding of the dry impregnated paper-ribbon on the mandrel begins and, owing to the fact that the surfaces 27 and 37 of the cooperating members 26 and 35 are of progressively larger diameters outwardly from the mandrel, and due also to the fact that the pressure-rollers 42, 42 restrain in proper degree the forward travel of that portion of the paper-ribbon with which they contact, the rugosities of the paper are reduced slightly in progressively-increasing extent crosswise the strip in just the right amount so that the strip curves sidewise in the correct degree to properly and smoothly fit on the surface 27 of the friction-sleeve 26.

Stated somewhat differently, the impregnated paper-ribbon is elongated lengthwise increasingly in substantially-regular progression crosswise the ribbon in order that it, when wound up, will have its convolutions and the spaces between the convolutions at an oblique-angle to the axis of the mandrel, that is, to the axis of the coiled body, such angle ordinarily being about 45°.

It will be apparent that if the paper-ribbon were wound directly flat convolution on convolution on a cylindrical form, no such crosswise graduated elongation would be necessary because all portions of the width of the strip at any point of the length thereof would be of like diameter in the completed body, although these diameters would differ at different points along the length of the strip.

On the other hand, it is clear that if, in the completed wound body, all the convolutions and the spaces between them were normal to, or at right-angles to, the axis of the mandrel or revolving form, the maximum degree of laterally-graduated elongation would be needed.

In the present instance, a midway point between these two extremes is employed in that the slope of the bevel surface 27 is about 45° to the axis of the mandrel or that of the formed body.

As has been stated, the paper-ribbon constituting the roll 40 has been preliminarily impregnated or thoroughly charged with a material such as a solution of phenolic-resin, and then dried, so that the material in the paper is such that when polymerized, it is not injured by the fluid to be filtered nor by any of its impairing or debasing ingredients.

In order that the successive, overlying convolutions of the wound paper ribbon may bear or press against one another with the required or needed pressure to obtain their proper contact with one another and to secure their adherence together during polymerization, the lengthwise travel of the sleeve 26, occasioned by the winding of the paper thereagainst under the inclined surface 37 must be resisted in proper degree, especially during the first part of the winding of the paper, and such resistance is produced by the friction of springs 28, 28 pressing and riding on the surface of the mandrel during the lengthwise travel of the sleeve.

As will be readily understood, as the winding progresses, the sleeve is gradually pushed along the mandrel being restrained in this movement or travel by the friction imposed by reason of the presence of these springs.

The body 50, thus continuously wound or coiled on the mandrel, slides on the latter through the heater-tube 45 where the imposed heat polymerizes the resin, and, while this action is taking place, the convolutions of the paper-ribbon are held together under adequate pressure so that they become firmly cemented together by the resin, thus forming an unusually strong and rigid unitary body, the heater-tube being of the proper length to assure this result.

In starting the beginning of the winding of the strip into the body 50, the sleeve 26 and its friction are required, but as the wound body becomes sufficiently elongated, it of itself provides adequate resistance by reason of its friction on the mandrel as it advances along the latter.

Accordingly, when the friction-sleeve 26 reaches the end of the mandrel 23 at 47, the operator detaches the front curled end of the paper-ribbon from the groove 64 and removes the sleeve from the appliance, but the wound body which at this point is firm, rigid and hard, continues its elongation and becomes supported by and guided by the anti-friction rollers 48, 48.

After such engagement of the front end of the body 50 with the rollers 48, the grinder 49 and cutter 53 are set in operation so that the outer surface of the body is smoothed or and polished and the intermittent movement of the cutter severs the body into individual stacks of proper lengths whereby the machine delivers from then on automatically the series of completed filter-packs.

In some cases, it may be desirable to have the cutter 53 travel longitudinally slightly with the body during its severing operation, and any one skilled in the art could provide means to afford such supplemental movement; inasmuch, however, as it takes but one complete revolution of the mandrel to effect such severance, and that single revolution represents only one layer of the thin paper, the cut-off ends of a single filter-pack are, in most instances, sufficiently true or at right-angles to the axis of the pack for satisfactory employment.

A filter-pack of this type, in which the convolutions are at about 45° to the axis of the pack and in which the convolutions are well adhered together by the polymerized impregnating material, has several distinct advantages.

In the first place, the pack is self-supporting and it can be made thinner than formerly.

In the second place, it requires no supporting metal or other core.

In the third place, it can be made to supply a finer degree of filtration.

In the fourth place, it has a greater uniformity of filtering action.

In the fifth place, there is no waste of paper or broken paper; and

In the sixth place, owing to the angular relation of the spaces between the charged-paper convolutions to the longitudinal internal passage in the pack, a sudden change of direction in the flow of the fluid to be filtered can be had, which, in some cases, is a distinct advantage in that solids in such fluid can be discharged centrifugally therefrom and not tend to clog the filter.

Figure 12:
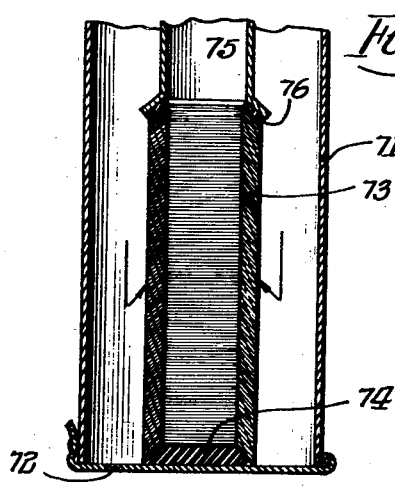
Figure 12 presents in section a slightly-different form of filter-pack in a filter container or shell.
Figure 5:
Figure 5 is a face view of a fragment of the crepe-paper strip or ribbon before it is wound into spiral-conformation.

This feature is illustrated in Figure 12, wherein the casing 71 with an openable bottom 72 houses a filter-pack 73 of the novel type under consideration, which is closed at its lower end by a disc 74, its open top end being equipped with a discharge-conduit 75 having a resilient gasket 76 between itself and the adjacent end of the pack.

In this case, the two ends of the filter-pack are bevelled at 45° which may be provided in any convenient or suitable manner.

The fluid to be filtered, such as air, descends under pressure in the housing 71, as shown by the arrows, and then abruptly changes its course upwardly to pass through the upwardly inwardly inclined spaces between the convolutions of the material of which the pack is formed, this sudden and substantial change of direction tending to throw any solid particles in the air into the bottom portion of the housing from which they can later be removed, thus lessening the work performed by the filter-element.

Instead of winding a single crepe-paper strip or ribbon on the rotary form, a plurality of them in parallel relation may be wound thereon simultaneously, as shown in Figure 11, and, in that case, the separate strips may be stretched or lengthened individually or all together as a unit.

In all cases, the lengthwise elongation of the strip or strips in graduated degree laterally of the strip results in a corresponding graduated lessening of the height of the transverse rugosities of the crepe-paper ribbon, and, ordinarily, the least height of such ribs or elevations are located at the outer surface of the finished filter-element so that the fluid which passes through such gap or space finds freer travel inwardly through the remainder of such space, thus facilitating the filtering operation.

This invention as described above and as defined in the appended claims is not necessarily confined to the exact details set forth herein and these may be varied or modified within reasonable limits without departure from the invention and without the sacrifice of any of its material advantages.

I claim:

1. In the method of making a hollow edge-filtration filter-unit, stable against the action of the fluid to be filtered thereby and of its one or more contaminants, including the known steps of helically-winding a ribbon with transverse rugosities into a hollow cylindrical body with the successive convolutions of the coiled ribbon in face-to-face contact with one another and with shallow spaces between said convolutions, and advancing said body longitudinally during the winding relatively to the unwound portion of the ribbon, the novel combination of features being the steps (a) of elongating the ribbon lengthwise prior to its winding by reducing the heights of its transverse rugosities from one edge of the ribbon inwardly in substantially uniformly increasing degree thereby curving the ribbon laterally, and, (b) while helically winding the elongated curved ribbon, maintaining its convolutions and the spaces between them at an oblique-angle to the axis of the body being formed, and with the other edge of the ribbon at such position that it is at the outer surface of the finished body.

2. The novel combination of features in the method of making a hollow edge-filtration filter-unit as set forth in claim 1, in combination with the additional novel feature that said ribbon elongation is effected by restraining the feed of the unwound ribbon and stretching the restrained unwound portion of the ribbon by the winding operation.

3. In a hollow edge-filtration filter-unit composed of registered face-to-face contacting convolutions of a slightly-rough helically-wound ribbon material, stable against the action of the fluid to be filtered and of its one or more contaminants, and having shallow spaces between the convolutions, the novel combination of features being (a) that said ribbon material is porous and impregnated with an agent rendering it stable as stated, (b) that said convolutions are adhered together by said agent, and (c) that said convolutions and said intervening spaces are disposed obliquely to the axis of the filter-unit.

4. The novel combination of features in a hollow edge-filtration filter-unit as set forth in claim 3, including the additional novel feature (d) that said ribbon material is crepe-paper having its substantially-parallel rugosities extending crosswise the ribbon and graduated substantially uniformly in degree of roughness transversely of the ribbon.

5. The novel combination of features in a hollow edge-filtration filter-unit as set forth in claim 3, in combination with the additional novel feature (d) that said ribbon material is crepe-paper having its substantially-parallel rugosities extending crosswise the ribbon and of substantially-uniformly tapered heights with their least height at the edge of the ribbon at the external surface of the filter-unit.

6. In a hollow edge-filtration filter-unit composed of registered face-to-face contacting convolutions of a slightly-rough material, stable against the action of the fluid to be filtered and of its one or more contaminants, and having shallow spaces between the convolutions, the novel combination of features being (a) that said convolutions are formed of a plurality of parallel helically-wound ribbons of crepe-paper each having its substantially-parallel rugosities extending crosswise the ribbons, (b) said rugosities being of substantially-uniformly tapered heights with their least height at the outer edges of the ribbons at the external surface of the filter-unit, (c) that said ribbons are impregnated with a polymerized phenolic-resin rendering them stable as stated, (d) that said resin adheres said convolutions together, and (e) that said convolutions and said intervening spaces are disposed obliquely to the axis of the filter-unit.

7. In the method of making a hollow edge-filtration filter-unit, stable against the action of the fluid to be filtered thereby and of its one or more contaminants, including the known steps of helically winding a ribbon with transverse rugosities into a hollow cylindrical body with the successive convolutions of the coiled ribbon in face-to-face contact with one another and with shallow spaces between said convolutions, and advancing said body longitudinally during the winding relatively to the unwound portion of the ribbon, the novel improvement (a) that said ribbon is impregnated with a polymerizable agent, (b) of elongating the ribbon lengthwise prior to its winding by reducing the heights of its transverse rugosities from one edge of the ribbon inwardly in substantially uniformly increasing degree thereby curving the ribbon laterally, and (c) of heating said formed body while it is being advanced as stated and thereby polymerizing said agent to provide said stable characteristic to said body.

8. In the method of making a hollow edge filtration filter-unit, stable against the action of the fluid to be filtered thereby and of its one or more contaminants, including the known steps of helically winding a ribbon with transverse rugosities into a hollow cylindrical body with the successive convolutions of the coiled ribbon in face-to-face contact with one another and with shallow spaces between said convolutions, and advancing said body longitudinally during the winding relatively to the unwound portion of the ribbon, the novel improvement (a) that said ribbon is impregnated with a polymerizable agent, (b) of polishing the external surface of the formed body during its continued formation, and (c) of severing from said polished body during its continued formation individual lengths thereof each constituting a filter-unit.

WALTER KASTEN.

REFERENCES CITED

The following references are of record in the file of this patent:

UNITED STATES PATENTS

| Number | Name | Date |
|---|---|---|
| 2,110,009 | Wiedenbacker | Mar. 1, 1938 |
| 2,079,475 | Williams et al. | May 4, 1937 |
| 2,141,436 | Harris | Dec. 27, 1938 |
| 1,844,247 | Everett | Feb. 9, 1932 |
| 1,955,903 | Cammen | Apr. 24, 1934 |
| 1,824,079 | Foley | Sept. 22, 1931 |
| 2,042,537 | Liddell | June 2, 1936 |
| 2,133,004 | Williams et al. | Oct. 11, 1938 |
| 1,284,296 | Frederick | Nov. 12, 1918 |
| 1,295,230 | Stevenson | Feb. 25, 1919 |
| 1,303,753 | Wright | May 13, 1919 |
| 1,078,674 | Hamill | Nov. 18, 1913 |
| 990,861 | Hamill | May 2, 1911 |
| 1,820,533 | Foley | Aug. 25, 1931 |
| 1,974,235 | Cammen | Sept. 18, 1934 |
| 1,744,510 | Hele-Shaw et al. | Jan. 21, 1930 |
| 1,771,928 | Jung | July 29, 1930 |
| 1,840,317 | Horvath | Jan. 12, 1932 |
| 2,007,753 | Ericson | July 9, 1935 |
| 860,720 | Adams | July 23, 1907 |
| 2,130,355 | Magill | Sept. 20, 1938 |
| 2,148,708 | Orr | Feb. 28, 1939 |
| 2,041,889 | Wheeler | May 26, 1936 |

FOREIGN PATENTS

| Number | Country | Date |
|---|---|---|
| 796,664 | France | Jan. 27, 1936 |
| 630,915 | France | Sept. 3, 1927 |